May 15, 1962 E. P. LARSH ET AL 3,034,479
APPARATUS FOR FLOW COATING THE SLOTS OF A SLOTTED STATOR
Filed Oct. 17, 1957 3 Sheets-Sheet 1
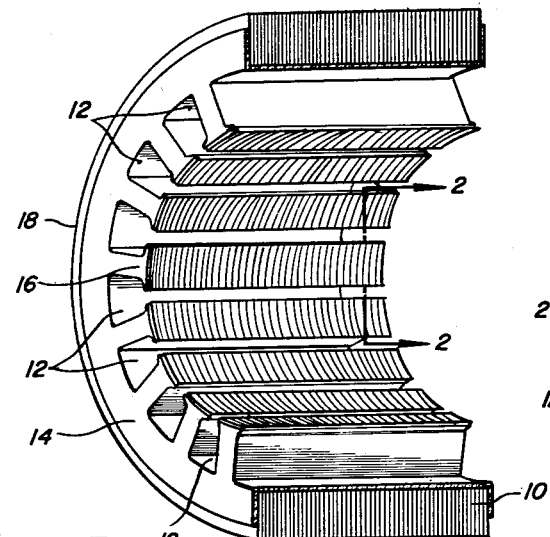
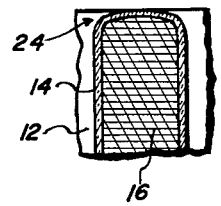
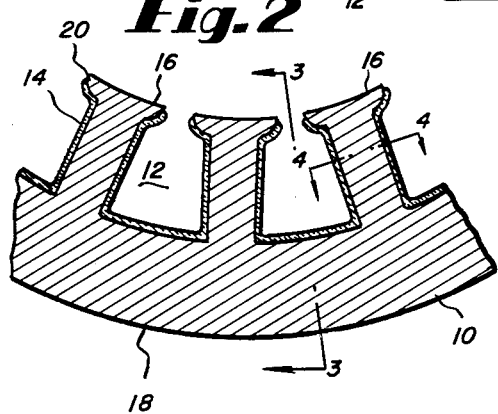
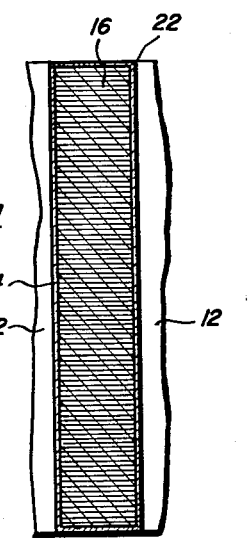
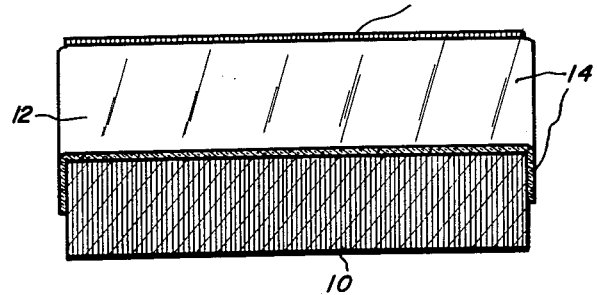
INVENTOR.
EVERETT P. LARSH
BY Taulmin & Taulmin
Attorneys

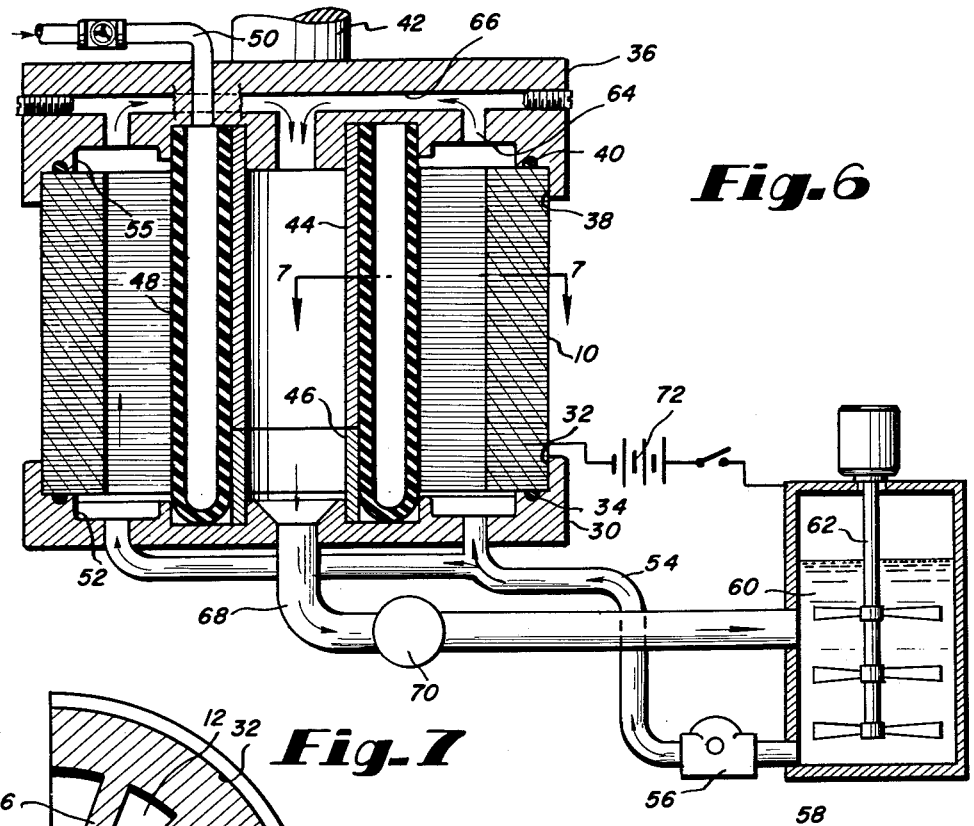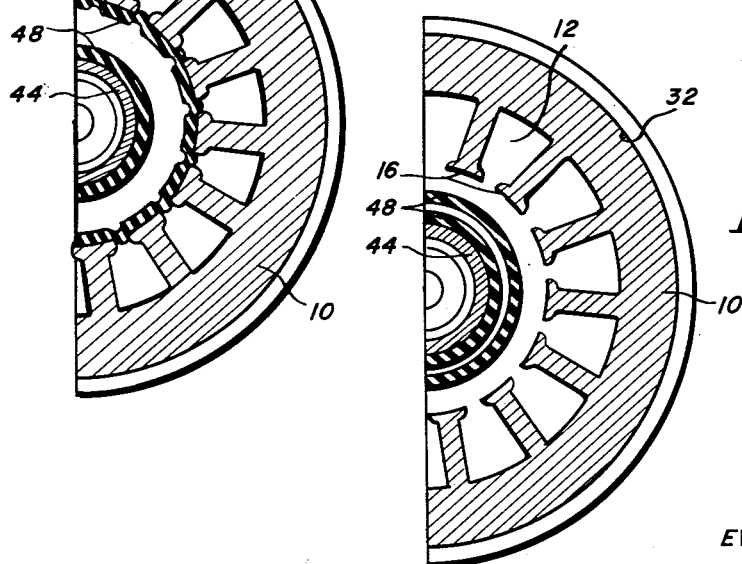

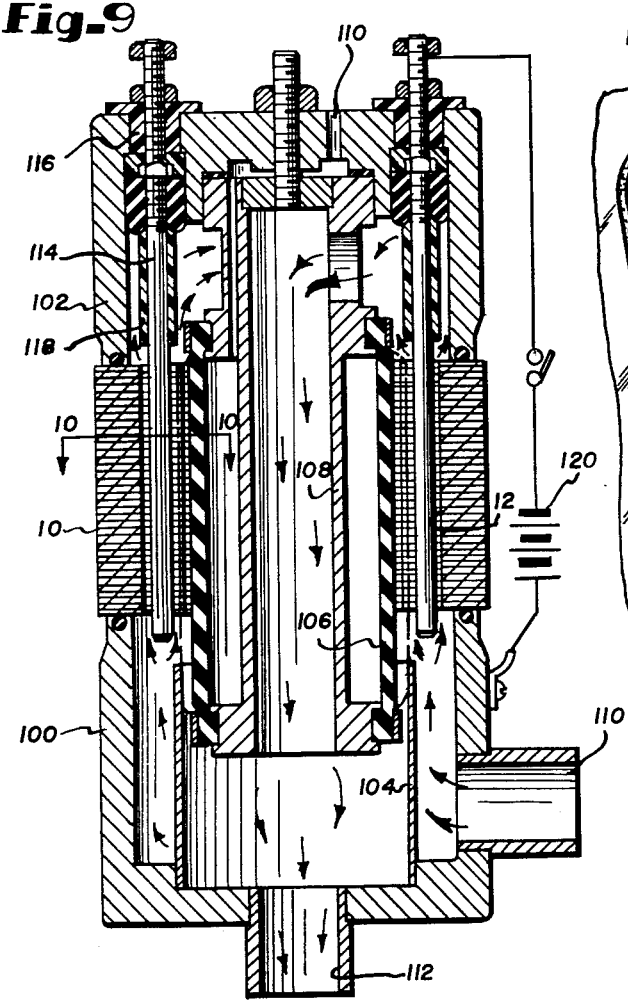
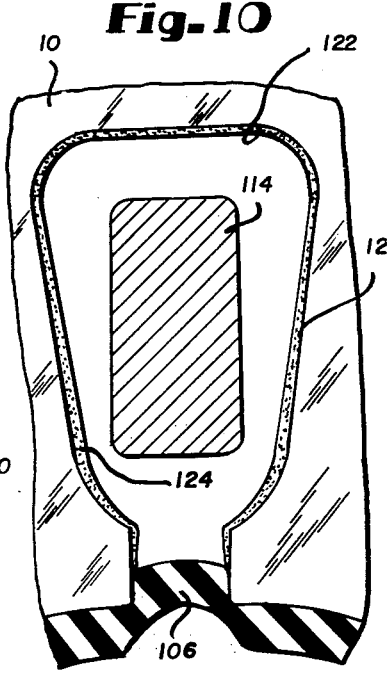
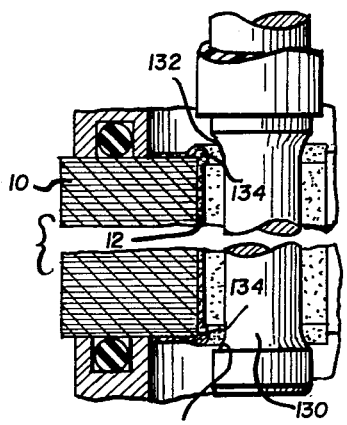
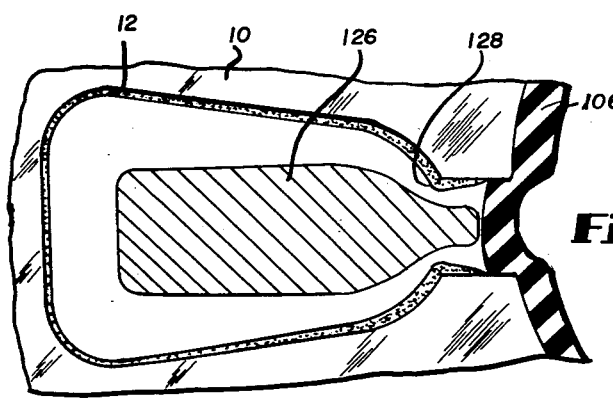

United States Patent Office 3,034,479
Patented May 15, 1962

3,034,479
APPARATUS FOR FLOW COATING THE SLOTS OF A SLOTTED STATOR
Everett P. Larsh, 124 E. Monument Ave., Dayton, Ohio, and Theodore R. Black, Sr., and Franklin E. Coppock, Dayton, Ohio; said Black and said Coppock assignors to said Larsh
Filed Oct. 17, 1957, Ser. No. 690,705
2 Claims. (Cl. 118—406)

This invention relates to electric motors and is particularly concerned with the insulation of the iron parts of electric motors. In a limited sense the present invention relates to the insulation of the stator iron of an electric motor but it can also be adapted to the insulation rotor or armature iron if desired.

In electric motors, particularly alternating current electric motors the stator iron generally takes the form of a stack of laminations bonded together as by welding or rivets or the like and having slots opening inwardly toward the center of the stator iron and in which slots the field windings of the stator are placed. In smaller motors the field coils are wound in situ and because of this the stator slots are provided with insulation preparatory to the winding operation, such insulation usually taking the form of relatively heavy insulating paper. Paper of this nature usually forms an effective insulation on the inside of the slots but is bulky and makes the winding operation at least somewhat inconvenient. Additionally, the operation of placing the paper in the stator slots involves time and after the windings are in place, the paper must either be folded into the slot or cut off so that a wooden peg or the like can be driven into the slots to close the openings thereof. Paper insulating strips of this type must also project beyond the ends of the slots in order to protect the wires where they bend at the end of a slot in passing across the end of the stator to enter another slot.

Having the foregoing in mind, the present invention proposes as a primary object the provision of an improved method and apparatus for insulating the iron portions of electromagnetic units such as motor stators, motor armatures or even the iron part of stationary electromagnetic apparatus such as relays and the like.

Another object of the present invention is the provision of a method and apparatus for treating magnetic iron parts whereby to eliminate the necessity for using heavy insulating papers and the like.

Another object of the present invention is the provision of an improved iron part for a magnetic unit in which the bulk of insulating material required between the windings and the iron is kept to an absolute minimum.

A still further object of this invention is the provision of a method and apparatus for preparing iron magnetic members such as electric motor stators which will facilitate the winding of the magnetic members and produce, at the same time, a superior product.

Another object of this invention is the provision of a method and apparatus for treating a magnetic iron member such as an electric motor stator wherein a stator results in which the windings can be applied thereto in the most efficient manner and the most efficient use made of the iron of the magnetic member.

In brief, the present invention concerns the application to the iron part of an electromagnetic unit of a ceramic or glass insulating coating to separate the iron from the windings to be applied thereto thereby eliminating the use of insulating paper and the like. According to the present invention the application of the ceramic or glass to the iron member is accomplished without the use of pickling by acids or the like as is usually done whereby the hazard of the pickling chemicals being retained between the laminations of the iron member are eliminated. Instead, the surface to be coated is vigorously flushed with a solution of glass or ceramic and this flushing is continued until the surface of the iron is completely free of oil or small metal shavings or the like whereby a continuous coating is deposited on the surface to be treated and which coating can then be fired to set it permanently in place.

The several objects and advantages of the present invention referred to above as well as still others will become more apparent upon reference to the drawings in which:

FIGURE 1 is a perspective view in cross section showing the iron part of an electric motor stator that has been treated according to the present invention so that a ceramic or glass insulating coating is fired thereon over the area that is to receive the motor windings;

FIGURE 2 is a sectional view indicated by line 2—2 on FIGURE 1 showing at somewhat enlarged scale a cross section through some of the motor slots;

FIGURE 3 is a cross sectional view indicated by line 3—3 on FIGURE 2 showing the appearance of one of the slots on the inside thereof;

FIGURE 4 is a cross sectional view indicated by line 4—4 on FIGURE 2 showing a bar portion between two adjacent slots in section illustrating the continuous nature of the insulating coating thereon;

FIGURE 5 is a fragmentary view showing the manner in which the corners of the bars between the slots can be rounded off as by a swaging operation to eliminate a region of high stress in the insulating film;

FIGURE 6 is a sectional view somewhat diagrammatic in nature illustrating an apparatus according to this invention for treating stators;

FIGURE 7 is a sectional view indicated by line 7—7 on FIGURE 6 showing the apparatus with the expansible rubber like bag portion thereof expanded to close the openings of the slots in the stator and to protect the faces of the bars between the stator;

FIGURE 8 is a view like FIGURE 7 but showing the bag collapsed for the insertion or removal of a stator.

FIGURE 9 is a vertical sectional view similar to FIGURE 6 but showing a more refined form of the coating apparatus in which electrodes are employed for controlling the deposition of the ceramic material;

FIGURE 10 is a sectional view indicated by line 10—10 on FIGURE 9;

FIGURE 11 is a view like FIGURE 10 but showing shaped electrode for controlling the thickness of the ceramic deposit about different regions of the slots; and FIGURE 12 is a vertical sectional view along a slot showing the manner in which the ends of the electrodes could be formed to provide for a bead at the ends of the slot.

Referring to the drawings somewhat more in detail, in FIGURE 1, 10 indicates the laminated iron part of an electric motor stator. Iron part 10, as is customary in electric motors of the alternating current type, is provided with a plurality of uniformly circumferentially spaced slots 12 in which the windings of the field coils are to be located.

According to the present invention insulation is provided between the stator iron and the windings by a ceramic or glass insulating film 14 which coats the insides of the slots and the ends of the stator from the tips of the bars or teeth 16 separating the slots out to adjacent the outer periphery 18 of the stator iron.

As will be seen in FIGURE 2 at 20 the insulating film or coating or layer 14 extends to a point just short of the tips of the teeth or bars 16.

FIGURES 3 and 4 will illustrate the continuity of the film or coating 14 and from which views it will be evident that the laminations are completely isolated from any windings that may be placed in the slots. It is understood, of course, that the laminations making up the stator iron are firmly connected together according to any conventional practice and which may consist of welding the laminations together, securing them together by rivets or by pressing them together with an adhesive therebetween, or by any combination thereof. To all intents and purposes, thus, the laminated magnetic member is a solid element and the individual laminations will not shift relative to each other whereby the film or coating deposited thereon according to this invention will not become cracked or broken under any normal conditions of usage.

It will be noted in FIGURE 4 that the ends of the slots terminate in relative sharp corners as indicated at 22. These sharp corners introduce relatively high stresses, both mechanical and electrical into the film or coating of insulating material and with this in mind it is also a part of the present invention to round off these corners prior to the application of the insulating film or coating as indicated at 24 in FIGURE 5. This rounding off can be done by cutting the laminations but a more economical procedure would be a stamping or swaging operation at which time all corners on both ends of the stator could be formed to a somewhat rounded configuration as illustrated at one time.

As to the apparatus by which this invention is practiced, reference may be had to FIGURES 6 through 8. In these figures it will be seen that the apparatus comprises a base member 30 having a recess at 32 into which the stator iron 10 can be placed. A sealing ring may be provided about the base at 34.

The apparatus also comprises a movable top part 36 having a recess 38 to engage the top end of the stator and with there being a sealing ring 40 similar to the sealing ring 34. The top part 36 may have a ram 42 attached thereto by means of which the said top part is moved toward and away from base part 30.

Top part 36 has a sleeve 44 extending downwardly therefrom in the center and this sleeve is adapted for registration with a shorter sleeve 46 extending upwardly from the center of the base part.

Surrounding sleeve 44 and sealingly attached to top part 36 is an annular rubber-like bag 48. Bag 48 when deflated, is slightly smaller in outside diameter than the inside diameter of the stator iron 10. When expanded by a supply of air pressure to the inside of the bag via conduit 50 the bag will expand and fit closely against the ends of the teeth of the stator and project a slight distance into the slots 12. This covers the inner faces of the teeth and also provides for the uncoated region at 20 along the mouths of the slots as previously referred to.

The base part 30 is provided with an annular recess 52 to which is connected conduit means 54 leading from a pump 56 that has its suction side connected to a reservoir 58 in which the solution of ceramic or glass 60 is retained and which solution is maintained agitated by the motor driven agitator 62.

The annular recess 52 communicates with all of the slots 12 of the stator iron and the solution delivered to the annular recess by pump 56 flows upwardly through the slots and emerges from the upper end thereof and enters a corresponding annular recess 55 in the top part 36. Recess 64 communicates via passage means 66 with sleeves 44 and 46 and which in turn communicate with a return conduit 68 in base member 36. Conduit 68 returns the flowing solution back to reservoir 58 through a magnetic separator 70 and which separator extracts any magnetic particles picked up from the stator by the solution.

In practice, the stator iron 10 is placed on base part 30 and the top part 36 is closed thereon. At this time the bag 48 is deflated. The assembly will then appear as it does in FIGURE 8. The bag 48 is then inflated and it will engage the inner ends of the teeth and close the mouths of the slots as illustrated in FIGURE 7. At this time the pump 56 is set into operation and this causes the solution to flow through the stator iron and return to reservoir 58. A substantial pressure is maintained so that the solution flows rapidly and this will flush any shavings and other bits of foreign material off the surface of the stator iron 10 and will also tend to abrade the surface somewhat whereby the surface to be coated is rendered completely clean and free of objectionable particles of the metallic material and other foreign material while at the same time a "tooth" is provided for the solution by its abrading action. The pressure employed for circulating the solution also tends to force the solution into any spaces that may exist between adjacent laminations and this still further enhances the gripping action of the solution by which it is held to the iron.

It has been found that a much thicker coating of the material can be had by connecting a source of electrical energy such as battery 72 so that one terminal thereof is connected with the stator iron and the other terminal thereof is connected with the solution. The exact reason why this arrangement results in an increased thickness of coating is not entirely known but it appears that the solution is sufficiently electrically conductive to permit an electrolytic action while it is in a fluid state whereby an increased thickness of the coating results. In practice, we find that the best results are obtained by connecting the negative terminal to the stator iron and the positive terminal to the solution. A voltage of about 2 volts has been used with a current density of about 0.1 ampere per square inch. These particular values, however, will vary with the particular glass or ceramic composition employed. It might be noted that it has been found that smoother deposits are had with the lower voltages.

After the stator iron has been flushed a sufficient length of time and the deposit has been built up thereon, the pump 56 is stopped, the fixture is opened, and the stator can then be placed in an oven for firing the glass or ceramic coating to fix it in place.

It might be noted at this point that all surfaces of the conduits and fixture and the bag 48 might either consist of or be coated with Teflon which will inhibit any tendency for the material to deposit out thereon.

Any glass or ceramic composition having good electrical insulating characteristics is suitable for the purpose of insulating stators according to the present invention. Preferably, the glass composition will have about the same coefficient of expansion as the iron of the stator to prevent cracking when the motor temperature changes, is free of ingredients such as alkalies which leach out, and fuses at about 1250° F. Most such materials can be supplied in the form of a powder or frit or in sufficiently finely granulated form that they can be conveyed by a fluid vehicle such as distilled water or methanol.

From the foregoing it will be seen that the present invention provides for a novel method and apparatus for insulating magnetic iron members forming a part of electromagnetic equipment and in particular the iron parts of stators for alternating current electric motors. The present invention also provides an improved insulated magnetic element per se having a wide field of use.

While the invention is particularly useful in connection with electric motors and has been illustrated and described therewith, it will be understood it could also be employed in connection with armatures and other electromagnetic apparatus. The presently contemplated best field of use of the present invention is in the field of alternating current electric motor stators because the highest voltage gradient between the wires and the iron is encountered in these members and because the advantages to be gained from the practice of the present invention are the most pronounced in connection with this particular work member.

Referring to FIGURE 9, the stator 10 is shown resting on a base member 100 and is clamped thereto with a top part 102 and with both the base and top parts sealed against the rotor similarly to the FIGURE 6 arrangement.

The arrangement of FIGURE 9 has a sleeve 104 in the base part and the rubber bag 106 is in the form of a sleeve mounted on the hollow metal carrier member 108. It will be evident that a supply of air under pressure to the inside of sleeve 106 via port 110 in the cap 102 will cause expansion of the sleeve outwardly against the inner periphery of the rotor and extending part ways into the slots thereof and with the sleeve also expanding to close the upper end of metal sleeve 104. With the rubber like sleeve expanded the coating material is pumped in through conduit 110 and then passes upwardly through the rotor slots and then downwardly through the hollow member 108 into metal sleeve 104 and then discharges through discharge conduit 112.

In the FIGURE 9 modification the cap 102 carries a plurality of electrodes 114 that extend into the slots of stator 10. These electrodes are insulatingly mounted in the cap 102 as by the washers or bushings 116 and also preferably comprise electrical insulating sleeves or coatings 118 located above the stator.

A source of voltage 120 is connected between the electrodes and which are cathodic, and the stator which is anodic, for obtaining the increased rate of deposition and increased thickness of film referred to above.

FIGURE 10 will illustrate the manner in which electrode 114 increases the thickness of the deposited film 122 and controls the thickness thereof. In FIGURE 10 it will be noted that the deposited film is thickest at 124 where the electrode is closest to the stator. With this in mind, the electrode may be shaped as indicated by electrode 126 in FIGURE 11 and wherein the electrode generally follows the slot contour while gradually approaching the slot from bottom to top thereof so that the film deposited gradually thickens toward the top of the slot and may even include a small bead at 128 at the mouth of the slot where considerable abrasion of the coating material is apt to occur during a winding operation and also where electrical and mechanical stresses are apt to be higher than elsewhere in the slot.

The electrodes may also be formed at the ends to provide for beads at the ends of the slots and FIGURE 12 shows an electrode 130 which has flared out portions 132 at its opposite ends whereby a bead 134 is formed about the corner at each end of each slot. This is the point where the coating will be most severely used during winding since the individual wires will bend about the corners as the stator winding is put in place.

It is conceivable, of course, that if the thickness of film normally deposited in a slot is sufficiently thick, the beads 134 referred to could be provided by short electrodes located adjacent the ends of the slots and not extending therethrough. Thus, the electrode deposition would be limited to the corners of the slots at the ends thereof should this prove to be sufficient as might be the case with very small motors wound with relatively fine wire.

It will be appreciated that the present invention not only discloses a new and novel stator frame with glass or ceramic insulation, but also discloses a new method to process stator frames so as to provide the slot portions thereof with such insulation and in addition thereto introduces the novel concept of applying the glass or ceramic material without acid etching of the metallic base and further concept of controlling the deposition of the material by electrical methods.

It will be understood that this invention is susceptible to modification in order to adapt it to different usages and conditions; and, accordingly, it is desired to comprehend such modifications within this invention as may fall within the scope of the appended claims.

We claim:
1. An apparatus for flow coating the slots of a slotted stator comprising; a base member, a top member, said members being movable toward each other for sealingly engaging opposite ends of the slotted stator being coated, a recess in each member exposing the ends of the stator from slightly outwardly of the bottoms of the slots therein inwardly, an elongated sleeve on the top member extending downwardly into the bore of said stator and between said base and top members, said base member having a short sleeve registering with said elongated sleeve on the top member and providing a conduit extending through the stator bore when said members are brought together and in engagement with the opposite end of the stator, an expansible bag carried by said top member and surrounding said elongated and short sleeves, means for expanding said bag into sealing engagement with said top member and said stator bore, a container for flowable insulating material, pumping means connected to said container and said base member for supplying the insulating material under pressure to the recess in the base member and to the lower ends of the slots in said stator, a port and fluid passageway connecting said recess in said top member with said base and top sleeves, and a conduit connecting said sleeves with said container for returning the flowable insulating material thereto.

2. An apparatus for flow coating the slots of a slotted stator comprising; a base member, a top member, said members being movable toward each other for sealingly engaging opposite ends of the slotted stator being coated, a recess in each member exposing the ends of the stator from slightly outwardly of the bottoms of the slots therein inwardly, an elongated sleeve on the top member extending downwardly into the bore of said stator and between said base and top members, said base member having a short sleeve registering with said elongated sleeve on the top member and providing a conduit extending through the stator bore when said members are brought together and in engagement with the opposite end of the stator, an expansible bag carried by said top member and surrounding said elongated and short sleeves, means for expanding said bag into sealing engagement with said top member and said stator bore, said short sleeve of the base member being positioned to receive the end of said expansible bag whereby expansion of said bag into engagement with said short sleeve provides a seal between said insulating material introduced into said base member and material flowing therefrom, a container for flowable insulating material, pumping means connected to said container and said base member for supplying the insulating material under pressure to the recess in the base member and to the lower ends of the slots in said stator, a port and fluid passageway connecting said recess in said top member with said base and top sleeves, and a conduit connecting said sleeves with said container for returning the flowable insulating material thereto.

References Cited in the file of this patent

UNITED STATES PATENTS

| | | |
|---|---|---|
| 2,003,587 | Fahlman | June 4, 1935 |
| 2,215,166 | Sumner et al. | Sept. 17, 1940 |
| 2,232,812 | Studer | Feb. 25, 1941 |
| 2,304,067 | Anderson | Dec. 8, 1942 |
| 2,307,018 | Cardell | Jan. 5, 1943 |
| 2,400,576 | Sigmund et al. | May 21, 1946 |
| 2,401,415 | Duggan | June 4, 1946 |
| 2,483,066 | Sigmund et al. | Sept. 27, 1949 |
| 2,508,850 | Wirth | May 23, 1950 |
| 2,552,535 | Desantis et al. | May 15, 1951 |
| 2,723,363 | Desantis et al. | Nov. 8, 1955 |
| 2,800,447 | Graham | July 23, 1957 |
| 2,801,965 | Monahan | Aug. 6, 1957 |
| 2,807,844 | Hemphill | Oct. 1, 1957 |
| 2,820,752 | Heller | Jan. 21, 1958 |

FOREIGN PATENTS

| | | |
|---|---|---|
| 1,023,026 | France | Dec. 24, 1952 |